(12) United States Patent
Iwami et al.

(10) Patent No.: US 7,226,557 B2
(45) Date of Patent: *Jun. 5, 2007

(54) METHOD OF PRODUCING A GOLF BALL

(75) Inventors: Satoshi Iwami, Kobe (JP); Keiji Moriyama, Kobe (JP); Takashi Sasaki, Kobe (JP); Masaaki Kikuchi, Kobe (JP)

(73) Assignee: SRI Sports Limited, Kobe-Shi (JP)

( * ) Notice: Subject to any disclaimer, the term of this patent is extended or adjusted under 35 U.S.C. 154(b) by 258 days.

This patent is subject to a terminal disclaimer.

(21) Appl. No.: 10/840,222

(22) Filed: May 7, 2004

(65) Prior Publication Data

US 2004/0232590 A1 Nov. 25, 2004

(30) Foreign Application Priority Data

May 22, 2003 (JP) .............................. 2003-144628

(51) Int. Cl.
*B29C 43/02* (2006.01)
*B29C 43/18* (2006.01)

(52) U.S. Cl. .................. 264/248; 264/250; 264/279.1; 264/325

(58) Field of Classification Search ..................... None
See application file for complete search history.

(56) References Cited

U.S. PATENT DOCUMENTS

| | | | | |
|---|---|---|---|---|
| 5,816,937 A | * | 10/1998 | Shimosaka et al. | 473/354 |
| 6,093,357 A | * | 7/2000 | Bissonette et al. | 264/248 |
| 2003/0064828 A1 | | 4/2003 | Kato | |
| 2003/0064832 A1 | | 4/2003 | Ichikawa et al. | |

* cited by examiner

*Primary Examiner*—Edmund H. Lee
(74) *Attorney, Agent, or Firm*—Birch, Stewart, Kolasch & Birch, LLP

(57) ABSTRACT

There is provided a method of producing a golf ball, capable of forming a cover to have a uniform thickness to produce a golf ball excellent in resistance to abrasion. The method includes a step to subject a cover material mainly composed of a thermoplastic resin to heat and compression molding to form a half shell, and a step to allow two such half shells to be arranged on a core or an intermediate layer, joined together, and heat and compression molded to mold the cover to have a thickness of 0.3 to 1.5 mm.

4 Claims, 2 Drawing Sheets

METHOD OF PRODUCING A GOLF BALL

This nonprovisional application is based on Japanese Patent Application No. 2003-144628, filed with the Japan Patent Office on May 22, 2003, the entire contents of which are hereby incorporated by reference.

BACKGROUND OF THE INVENTION

1. Field of the Invention

The present invention relates to a method of producing a golf ball, capable of forming a cover to have a uniform thickness to produce a golf ball excellent in resistance to chunking (resistance to abrasion).

2. Description of the Conventional Art

Conventionally in producing a golf ball, an injection molding process or a heat and compression molding process is generally employed to place a cover on a core. As an example of the injection molding process, U.S. Publication No. U.S. Ser. No. 2003/0064832A1 discloses a method to inject a previously prepared material for a cover to be molded around a core for coverage. In the injection molding process, however, at an initial stage of injection of a material for a cover, a core is held by a pin at a center of a cavity, and when the injection enters a final stage, the pin recedes. As such the injection molding process can result in the core having its center offset from the ball's center and tend to provide a cover having an uneven thickness. A golf ball having a cover of a large thickness (for example of 1.4 to 2.3 mm) often ensures that it has sufficient physical properties even if injection molding provides a cover having an uneven thickness. If a cover has a small thickness (for example of 0.3 to 1.0 mm), however, and the thickness is uneven, it significantly negatively affects the ball's performance. Injection molding has its limit when it is used as described above.

By contrast, the heat and compression molding process, as compared with the injection molding process, can form a cover to have a uniform thickness. Accordingly for a cover having a small thickness, the heat and compression molding process can suitably be employed. U.S. Publication No. U.S. 2003/0064828A1 describes that in producing a solid golf ball including a cover having a thickness of 0.5 to 2.0 mm the cover's material or two half shells are compression molded to cover an intermediate layer. When a cover has a small thickness, however, the heat and compression molding process cannot provide the cover with a uniform thickness, facilitating the cover to partially have an insufficient thickness, an uneven thickness, or the like. Further, the cover's physical properties, resistance to abrasion in particular, cannot sufficiently be acquired just by controlling a covering process so as to provide a cover with a uniform thickness.

SUMMARY OF THE INVENTION

The present invention has been made to overcome the above described disadvantages and contemplates a method of producing a golf ball having a cover of a small thickness, in particular, without providing the cover with an insufficient thickness, an uneven thickness or the like, to allow the cover to have a uniform thickness and the golf ball to present excellent resistance to abrasion.

The present invention provides a method of producing a golf ball, molding a cover material mainly composed of a thermoplastic resin into two half shells which are in turn arranged on a core or an intermediate layer and joined together and then introduced into a mold formed of semispherical, (top and bottom) pieces, and heat and compression molded to allow a cover to cover the core or the intermediate layer. The method includes a first step to form the half shell by a heat and compression molding process, and a second step to allow the two half shells to be arranged on the core or the intermediate layer, joined together, and heat and compression molded to mold the cover to have a thickness of 0.3 to 1.5 mm. In the present invention, in the second step, if the mold has a temperature $T1°$ C. and the half shells start to flow at a temperature $T2°$ C., $T1$ minus $T2$ is preferably set within a range of $-3°$ C. to $+10°$ C. Further, in the first step, preferably the two half shells have a volume in total of 105% to 120% relative to that of the cover of the golf ball. Furthermore, preferably the second step includes a low pressure molding step exerting a pressure set within a range of 0.5 to 5 MPa and a subsequent, high pressure molding step exerting a pressure set within a range of 10 to 15 MPa. In the present invention, the cover is preferably designed to have a thickness of 0.3 to 10 mm.

In the present invention a "thermoplastic resin" indicates a synthetic resin that can provide a plasticity allowing it to be molded as it is heated, and it includes not only those which do not exhibit flowability at room temperature but also a thermoplastic elastomer formed of a hard segment and a soft segment, rubber and the like. Furthermore, ". . . mainly composed of a thermoplastic resin" means that no less than 50% by mass of a cover material is occupied by the thermoplastic resin. In the present invention a mold has a temperature, which is a temperature of a surface of the mold attaining a highest temperature throughout the heat and compression molding process.

Note that in the present invention numerical values associated with volume, thickness, and diameter are those at room temperature, unless otherwise specified.

In accordance with the present invention, the heat and compression molding process is performed in both of the first step to form the half shell and the second step to mold such half shells joined together on the core or the intermediate layer to form a cover so that a golf ball including a cover having a small thickness, in particular, can be produced without an insufficient thickness of the cover, crack formation or the like to provide the cover with a uniform thickness. A golf ball presenting excellent resistance to abrasion can thus be obtained.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the present invention, a cover material mainly composed of a thermoplastic resin is heat and compression molded into a half shell (a first step), and two such half shells are joined together on a previously molded core or intermediate layer to cover it and the intermediate product is then introduced into a mold formed of semispherical, top and bottom pieces, and heat and compression molded (a second step), to produce a golf ball. In the following, a typical embodiment of the present invention will be described with reference to the drawings.

Figure 1A:
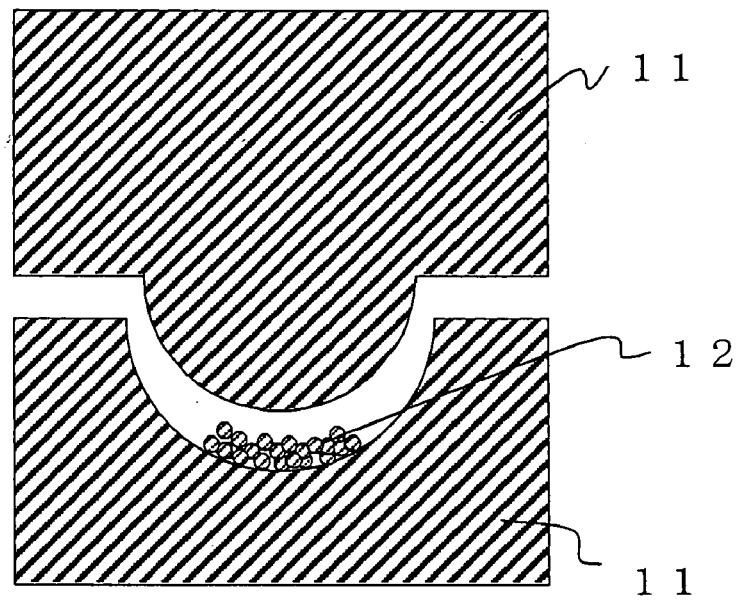
FIGS. 1A and 1B are cross sections for illustrating a first step in accordance with the present invention.
Figure 1B:
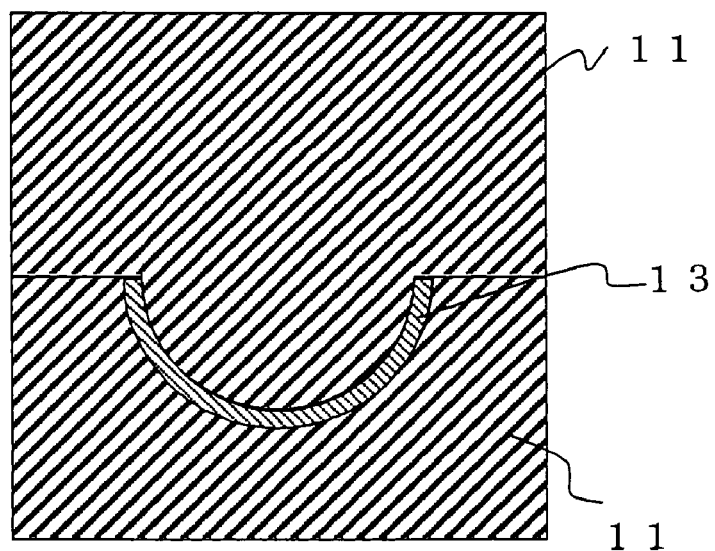

With reference to FIG. 1, a cover material 12 is introduced onto a bottom piece of a mold 11 having a top piece with a protrusion and the bottom piece with a recess (FIG. 1A), and then the mold is clamped with the top piece and the bottom piece engaged to subject the cover material to heat and compression molding, producing a half shell 13 having a thickness for example of 0.33 to 1.65 mm (FIG. 1B).

Figure 2:
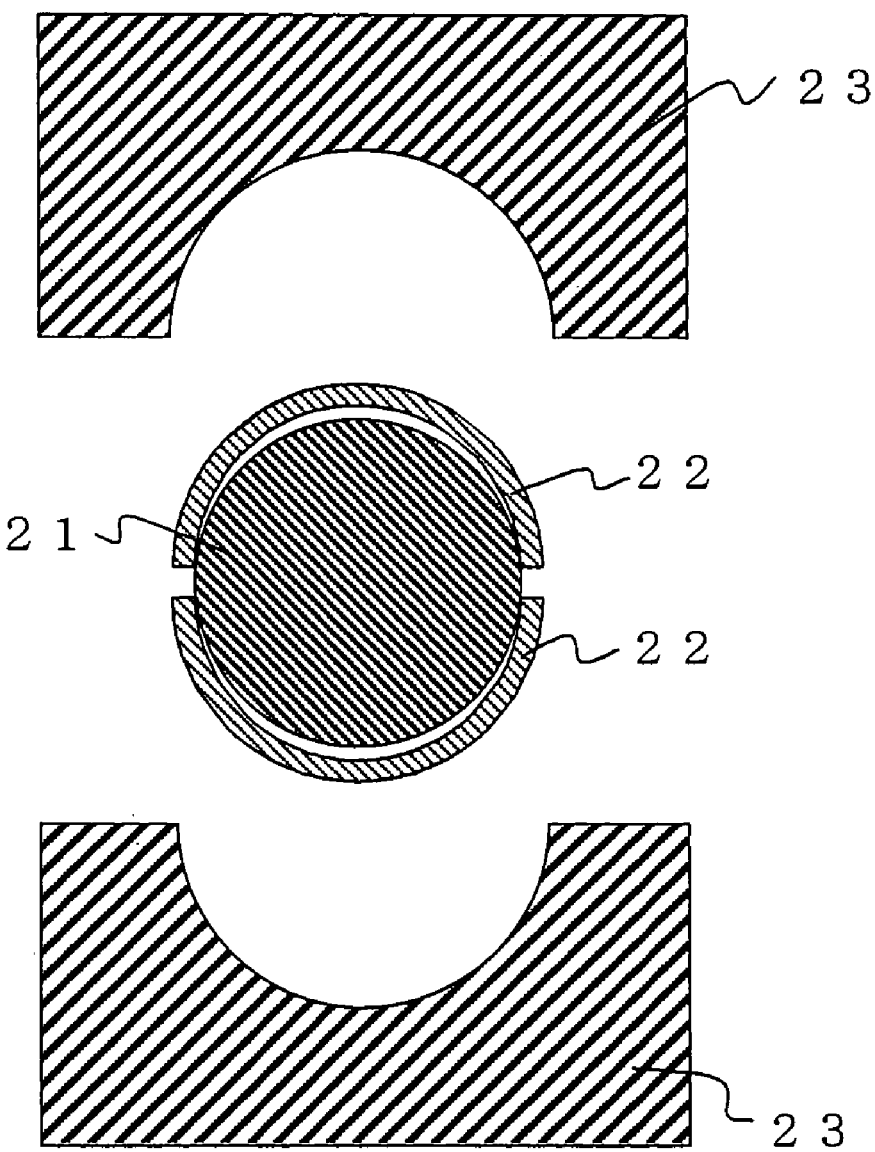
FIG. 2 is a cross section for illustrating a second step in accordance with the present invention.

With reference to FIG. 2, a ball material formed of a core 21 and two half shells 22 covering the core is set in a mold 23 formed of semispherical pieces, and the mold is clamped for example by a press to subject the ball material to heat and compression molding to cover core 21 with two half shells 22. A pressure used in the second step is preferably set at 0.5 to 5 MPa for a low pressure molding step and 10 to 15 MPa for a high pressure molding step. The two half shells have a volume in total preferably set to be 105 to 120% relative to that of a cover of a ball. The volume of the cover of the ball is that of a cover of a completed ball. Furthermore, the mold has a temperature T1 set so that T1−T2=−3 to +10° C. if the half shells start to flow at a temperature T2. In the heat and compression molding process, the half shells melt and flow with an appropriate melt viscosity maintained. If the two half shells have a volume in total larger than the cover's volume, an excessive amount of the cover material flows out of the mold at the mold's gap formed between the top and bottom pieces. Together with the excessive amount of the cover material, air remaining between the core and the half shells is also exhausted from the mold.

In the present invention, the heat and compression molding process is performed to form the half shell in the first step and to mold the half shells joined together on the core or the intermediate layer to cover it in the second step. Employing the heat and compression molding process for such steps allows a half shell of a small thickness to be molded with accuracy and to cover the core or the intermediate layer with a uniform thickness. Thus, even when the cover is desired to have a small thickness for example of 0.3 to 1.5 mm, the cover having a uniform thickness can be formed without causing insufficiency or unevenness in thickness of the cover. Further, employing the heat and compression molding process to form the half shell has an advantage to minimize residual stress in the cover material, allowing the cover material to have a sufficient physical strength. A golf ball presenting excellent resistance to abrasion can thus be produced.

In the first step, the cover material is introduced into a press cavity. With the cavity's temperature preferably set at no less than the temperature allowing the cover material to start to flow, the cover material is molded for example under a low pressure set at 0.5 to 5 MPa for 1 to 10 minutes and under a high pressure set at 7 to 13 MPa for 1 to 10 minutes. Thereafter, with the high pressure of 7 to 13 MPa maintained, the cover material is cooled down to obtain a half shell having a thickness of 0.33 to 1.65 mm. The cavity is preferably set at a temperature higher by 10 to 40° C., more preferably by 15 to 30° C. than that allowing the cover material to start to flow. If the cavity's temperature is set to be higher by 10° C. or more than the temperature allowing the cover material to start to flow, the cover material can sufficiently melt to produce a half shell having a uniform thickness. If the cavity's temperature is set to be higher than the temperature allowing the cover material to start to flow and is also set such that a difference between the cavity's temperature and the temperature allowing the cover material to start to flow is no more than 40° C., this can prevent the cover material from flowing out excessively and thus prevent insufficiency in thickness of the half shell.

The half shell is formed to have a thickness of preferably 0.33 to 1.65 mm, more preferably 0.35 to 1.1 mm, still more preferably 0.35 to 0.9 mm. This can provide a cover having a small and uniform thickness and a golf ball excellent in resistance to abrasion.

In the second step, the two half shells formed in the first step are joined together on the core or the intermediate layer and heat and compression molded to cover it. The second step preferably has two steps, a low pressure molding step and a high pressure molding step. While the cover material flows out through the low pressure molding step and the high pressure molding step, the air is substantially completely exhausted in the low pressure molding step. More specifically, a relatively low pressure is set for the low pressure molding step to prevent the cover material from rapidly flowing out and also substantially completely exhaust the air, and an excessive amount of the cover material is further flown out in the high pressure molding step. This two-step process as described above can prevent air from remaining between the core and the cover and also the cover from having an insufficient thickness.

After the heat and compression molding process is completed, the mold is still kept pressurized and reduced in temperature to slowly cool the obtained molding. After the molding is sufficiently reduced in temperature, it is removed from the mold and for example painted as appropriate to complete a golf ball.

In the present invention in the second step the mold preferably has a temperature T1 so set that T1−T2=−3 to +10° C., more preferably +1 to +9° C. if the half shells start to flow at a temperature T2. If T1 minus T2 is greater than −3° C., formation of a crack in the cover, which occurs when the half shells insufficiently melt and thus the portions of the two half shells that are joined together have an insufficient strength, can be prevented, and durability is ensured. If T1 minus T2 is smaller than +10° C., the cover material has a melt viscosity maintained within an appropriate range. The cover having a uniform thickness can thus be formed without having an insufficient thickness.

Preferably, the mold with the half shells set therein has a temperature set to be lower by no less than 30° C., preferably by no less than 50° C. than that allowing the half shells to start to flow, and thereafter in a molding process the mold's temperature is raised to temperature T1. This can prevent the cover material from excessively flowing out of the mold. The cover can more uniformly be formed.

The half shells when set within the mold have a temperature preferably set at no less than 0° C., more preferably no less than 10° C., still more preferably no less than 20° C., still more preferably no less than 23° C., still more preferably no less than 25° C., still more preferably no less than 30° C., since the half shells having a temperature set at no more than room temperature will cause an increase in production cost. Further, the half shells have a temperature preferably set at no more than 100° C., more preferably no more than 80° C., still more preferably no more than 60° C. to prevent the cover material from excessively flowing out of the mold and form the cover with a uniform thickness.

In the present invention the two half shells have a volume in total preferably set to be 105 to 120%, more preferably 110 to 118%, most preferably 112 to 114% relative to that of a cover of a golf ball. If the two half shells have a volume in total of no less than 105% relative to that of the cover of the golf ball, in the second step the cover material has no less than an amount thereof flowing out of the mold. This facilitates an amount of the cover material flowing out to be controlled to prevent the cover from having an insufficient thickness. Furthermore, the two half shells' volume in total that is no more than 120% relative to that of the cover of the golf ball provides no possibility of the cover material from having a large amount thereof flowing out of the mold (an amount of flash) in the second step. The cover can effectively be prevented from having an uneven thickness.

In the present invention the half shell has a thickness preferably set to be greater by 0.03 to 0.15 mm, more preferably by 0.05 to 0.10 mm than that of the cover of the golf ball. If the half shell has a thickness greater by 0.03 mm or more than that of the cover of the golf ball, in the second step the cover material has no less than an amount thereof flowing out of the mold. This prevents the cover from having an insufficient thickness. Furthermore, the half shell's thickness that is greater by 0.15 mm or less than that of the cover of the golf ball provides no possibility of the cover material from having a large amount thereof flowing out of the mold in the second step. The cover can effectively be prevented from having an uneven thickness and an increased amount of flash.

The present second step preferably includes a low pressure molding step applying a pressure set within a range of 0.5 to 5 MPa and a subsequent, high pressure molding step applying a pressure set within a range of 10 to 15 MPa. This can prevent air from remaining between a cover and a core and also provide the cover with a uniform thickness.

The low pressure molding step preferably applies a pressure within a range of 0.5 to 5 MPa, more preferably 1 to 4 MPa, still more preferably 2.5 to 3.5 MPa. A pressure of no less than 0.5 MPa does not allow the half shells to first melt to allow air to remain between the half shells and the core, and the obtained ball can completely be free of such air otherwise introduced. Furthermore, a pressure of no more than 5 MPa can eliminate a risk of a ball material receiving an excessive pressure before the half shells melt. The cover can thus be prevented from having an uneven thickness.

The high pressure molding step preferably applies a pressure within a range of 10 to 15 MPa, more preferably 11 to 14 MPa, still more preferably 12 to 13 MPa. If a pressure of no less than 10 MPa is applied, an amount of the cover material melting and thus flowing out of the mold can be controlled by pressurization. The cover can thus be effectively prevented from having an insufficient thickness. A pressure of no more than 15 MPa reduces a risk of excessively exerting pressure on and thus damaging the mold.

In the second step the low pressure molding step and the high pressure molding step can be performed for a period of time selected, as appropriate, depending on the cover material and thickness, the ambient temperature and the like. For example, the low pressure molding step can be performed for 1 to 6 minutes and the high pressure molding step can be performed for 3 to 15 minutes.

In the present invention the cover of the golf ball has a thickness of 0.3 to 1.5 mm, preferably 0.3 to 1.0 mm. When the present invention is employed to produce a ball having a cover of a small thickness (for example 0.3 to 1.0 mm, furthermore 0.3 to 0.8 mm), in particular, it effectively eliminates residual air between the cover and the core, insufficiency and unevenness in thickness of the cover, and other defects associated with molding, providing excellent resistance to abrasion. Note that in the present invention a cover has a thickness calculated as follows: a regular octahedron inscribed in a virtual golf ball is assumed and a land closest to each of six vertices is determined, and the cover's thickness is measured exactly under the six lands and averaged.

In the present invention a cover material mainly composed of thermoplastic resin is employed. More specifically, the cover material preferably contains no less than 50% by mass, more preferably no less than 80% by mass of the thermoplastic resin. Herein, the thermoplastic resin includes thermoplastic elastomer, and the thermoplastic elastomer preferably occupies no less than 50% by mass, more preferably no less than 80% by mass, still preferably 100% by mass of the thermoplastic resin component as such provides the cover with an excellent physical property. Preferable thermoplastic elastomer is that including at least one of thermoplastic polyurethane elastomer, thermoplastic polyamide elastomer, thermoplastic polyester elastomer, thermoplastic styrene elastomer and other similar thermoplastic elastomer. The present invention can suitably be applied to a cover material mainly composed of thermoplastic polyurethane elastomer, thermoplastic polyamide elastomer, thermoplastic polyester elastomer or other similar soft elastomer, and when thermoplastic polyurethane elastomer is used, in particular, a significant effect can be obtained.

The thermoplastic elastomer for example is Elastollan produced by BASF Polyurethane Elastomers Ltd., Kuramilon produced by Kuraray Co., Ltd., Pandex produced by Dainippon Ink and Chemicals, Inc. and the like for thermoplastic polyurethane elastomer, Pebax produced by Toray, Industries Inc. for thermoplastic polyamide elastomer, Hytrel produced by Du Pont-Toray Co., Ltd. and the like for thermoplastic polyester elastomer, and Rabalon produced by Mitsui Petrochemical Industries Ltd., Septon produced by Kuraray Co., Ltd. and the like for thermoplastic styrene elastomer.

Furthermore, as thermoplastic resin other than the above, ionomer resin, high density polyethylene, low density polyethylene, polypropylene or other similar olefin resin, nylon 6, nylon 66, nylon 11, nylon 12 or other similar nylon resin, natural rubber, polybutadiene rubber, polyisoprene rubber, ethylene-propylene-diene rubber (EPDM) or other similar rubber component can further be contained.

For a cover material other than thermoplastic resin serving as a main component, a co-curing agent, a crosslinking initiator, a filler, a colorant, a dispersant an antioxidant, a UV absorbent, a photo-stabilizer, a fluorescent material or fluorescent brightening agent and the like can appropriately be blended within a range that does not impair the cover's desired physical properties.

The present invention is applicable to producing a cover of a 2-piece golf ball including a core and the cover covering the core, a cover of a multipiece golf ball structured by at least three layers, and other similar covers. Note that if a core, a cover and an intermediate layer are provided, the intermediate layer may be a single layer, or two or more layers.

The core may be a solid layer or a thread-wound layer. For a solid core, a rubber compound can be used that for example has a rubber component including one or more of polybutadiene rubber, natural rubber, butyl rubber and the like with ionomer resin as a co-curing agent and organic peroxide as a crosslinking initiator blended therewith and furthermore an additive added thereto, as appropriate, and is kneaded and molded. The intermediate layer, as well as the core, can be a solid layer or a thread-wound layer.

The core can be produced by a general, known method. For example, components to be blended are mixed by means of a roll, a kneader, a banbury mixer or the like. The mixture is introduced into a mold, and pressurized at 145° C. to 200° C., preferably 150° C. to 175° C. for 10–40 minutes for vulcanization to produce a core. To allow the core and the cover to closely contact each other, the core may have a surface having an adhesive applied thereto or may have a surface roughened. External to the core, an intermediate layer can further be formed for example by injection molding or other similar technique.

EXAMPLES (1) Production of Golf Ball
Production of Core 100 parts by mass of hi cis polybutadiene rubber (JSR Corporation's BR01 having a cis-1,4-polybutadiene content of 96%), 27 parts by mass of zinc acrylate (ZNDA-90S produced by NIHON JYORYU KOGYO CO., Ltd.), 20 parts by mass of zinc oxide (produced by TOHO ZINC CO., LTD.), and 0.6 parts by mass of dicumyl peroxide (Percumyl D produced by NOF Corporation) are kneaded by a kneader and then introduced into a mold and press-formed at 160° C. for 20 minutes to produce a core having a diameter shown in Table 1.

TABLE 1

| | Example 1 | Example 2 | Example 3 | Example 4 | Example 5 | Example 6 | Example 7 | Example 8 | Comp. example 1 | Comp. example 2 | Comp. example 3 | Comp. example 4 | Comp. example 5 | Comp. example 6 |
|---|---|---|---|---|---|---|---|---|---|---|---|---|---|---|
| Diameter of core (mm) | 40.8 | 41.2 | 41.2 | 41.2 | 41.2 | 41.2 | 41.8 | 42.2 | 40.8 | 41.2 | 41.8 | 42.2 | 40.8 | 41.2 |
| Thickness of cover (mm) | 1.0 | 0.8 | 0.8 | 0.8 | 0.8 | 0.8 | 0.5 | 0.3 | 1.0 | 0.8 | 0.5 | 0.3 | 1.0 | 0.8 |
| 1st step | | | | | | | | | | | | | | |
| Half shell molding process | Heat & compression | Heat & compression | Heat & compression | Heat & compression | Heat & compression | Heat & compression | Heat & compression | Heat & compression | Injection | Injection | Injection | Injection | Injection | Injection |
| Thickness of half shell (mm) | 1.1 | 0.9 | 0.9 | 0.9 | 0.9 | 0.9 | 0.55 | 0.35 | 1.1 | 0.9 | 0.55 | 0.35 | — | — |
| Volume of half shell/volume of cover (%) | 110 | 113 | 113 | 113 | 113 | 113 | 110 | 117 | 110 | 113 | 110 | 117 | — | — |
| 2nd step | | | | | | | | | | | | | | |
| Molding process | Heat & compression | Heat & compression | Heat & compression | Heat & compression | Heat & compression | Heat & compression | Heat & compression | Heat & compression | Heat & compression | Heat & compression | Heat & compression | Heat & compression | Injection | Injection |
| Mold's Temp. T1(° C.) | 135 | 133 | 135 | 141 | 129 | 143 | 135 | 135 | 135 | 135 | 135 | 135 | — | — |
| Temp. T2(° C.) allowing half shells to start to flow | 132 | 132 | 132 | 132 | 132 | 132 | 132 | 132 | 132 | 132 | 132 | 132 | 132 | 132 |
| T1−T2(° C.) | 3 | 1 | 3 | 9 | −3 | 11 | 3 | 3 | 3 | 3 | 3 | 3 | — | — |
| Low Pressure (MPa) | 3 | 3 | 3 | 3 | 3 | 3 | 3 | 3 | 3 | 3 | 3 | 3 | — | — |
| pressure Time (min.) | 4 | 4 | 4 | 4 | 4 | 4 | 4 | 4 | 4 | 4 | 4 | 4 | — | — |
| High Pressure (MPa) | 13 | 13 | 13 | 13 | 13 | 13 | 13 | 13 | 13 | 13 | 13 | 13 | — | — |
| pressure Time (min.) | 8 | 8 | 8 | 8 | 8 | 8 | 8 | 8 | 8 | 8 | 8 | 8 | — | — |
| Physical Properties | | | | | | | | | | | | | | |
| Ball sphericity | 0.05 | 0.1 | 0.08 | 0.07 | 0.25 | 0.05 | 0.08 | 0.08 | 0.05 | 0.08 | 0.08 | 0.08 | 0.3 | un-moldable |
| Level of average uneven thickness of cover | ≤0.1 | ≤0.1 | ≤0.1 | ≤0.1 | ≤0.1 | ≤0.1 | ≤0.1 | ≤0.1 | ≤0.1 | ≤0.1 | ≤0.1 | ≤0.1 | 0.5 | |
| Incidence of insufficient thickness of cover | No | No | No | No | No | slightly | No | No | No | No | No | No | No | |
| Crack formation | No | No | No | No | No | No | No | No | No | No | Yes | No | No | |
| Coefficient of restitution (relative value) | 100 | 101 | 101 | 101 | 101 | 101 | 102 | 104 | 100 | 101 | 102 | 104 | 100 | |
| Resistance to abrasion | ○ | ○ | ○ | ○ | ○ | ○ | ○ | ○ | △ | △ | △ | △ | X | |

Production of Half Shell 80 parts by mass of thermoplastic polyurethane elastomer (Elastoran XNY97A, H12MDI-PTMG thermoplastic polyurethane elastomer produced by BASF Polyurethane Elastomers Ltd. (hardness: 97A)), 20 parts by mass of thermoplastic polyamide elastomer (Pebax 5533 produced by ATOFINA Japan K. K. (hardness: 55D)), and 5 parts by mass of titanium oxide (A-220 produced by ISHIARA SANGYO KAISHA LTD.) are blended together to provide a cover material, which is in turn kneaded by a 2-axis kneader and extruder and extruded thereby into pellets at 230° C. The material is extruded under the following conditions:

| | |
|---|---|
| Screw's diameter: | 45 mm |
| Screw's rate of rotation: | 200 rpm |
| Screw's L/D: | 35 |

Note that the cover material is heated at the location of a die of the extruder to 195° C. to 205° C.

In the first step of the present invention, the obtained pellets are introduced into a press cavity, and heat and compression molded at 150° C. under a low pressure set at 3 MPa for 3 minutes, and at 150° C. under a high pressure set at 10 MPa for 3 minutes. Thereafter, with the pressure of 10 MPa maintained, the molded material is cooled down for 9 minutes to obtain a half shell.

In comparative examples 1 to 4, the cover material described above is injection molded at 240° C. under a pressure set at 7 MPa to produce a half shell. In comparative examples 5 and 6, a half shell is not produced, and a cover is directly injection molded on a core under the conditions which will be described below.

Cover Formation

In the second step of the present invention, two produced half shells are arranged on a core and joined together. The intermediate product is introduced into a mold set at 23° C. and heat and compression molded under the conditions as shown in Table 1. In comparative examples 5 and 6, a cover is injection molded directly on a core at 240° C. under a pressure set at 8 MPa. The formed cover then has an outer side painted. Thus, 50 golf balls are produced for each example and each comparative example.

(2) Evaluation of Temperature Allowing the Half Shells to Start to Flow

Temperature allowing the half shells to start to flow is measured using SHIMADZU-FLOWTESTER CFT-500 as measuring equipment with a plunger area of 1 cm², DIELENG of 1 mm, DIE DIA of 1 mm, and a load of 60 kgf (588.399N) in a test performed with temperature raised at a constant rate.

(3) Evaluation of Sphericity

For each of the 50 golf balls, an average pole diameter minus an average seam diameter is measured by means of a dial gauge to calculate an average value of the 50 golf balls. Table 1 shows a result thereof (4) Evaluation of Level of Average Uneven Thickness of Cover For each of the 50 golf balls, the cover's maximum thickness and minimum thickness are measured to calculate the cover's uneven thickness level by the following expression:

Cover's uneven thickness level=(cover's maximum thickness−cover's minimum thickness)/cover's average thickness.

The cover's maximum thickness and minimum thickness are obtained by measuring the cover's thickness as seen in a projected photograph obtained by radiographically imaging the ball. Table 1 shows a result thereof. Note that the result is represented in a value of an average of the 50 golf balls.

(5) Evaluation of Incidence of Insufficiency in Thickness of Cover

Each of the 50 golf balls is externally, visually observed to check whether the cover has an insufficient thickness or not. Table 1 shows a result thereof.

(6) Evaluation of Crack Formation

A swing robot produced by True Temper Sports and having a metal head W#1 driver attached thereto is used with a head speed set at 45 m/sec to hit each of the 50 golf balls. Each ball is hit up to 100 times to check whether a crack is formed or not before it is hit 100 times. Table 1 shows a result thereof.

(7) Evaluation of Coefficient of Restitution

Each of 12 golf balls is impinged on by an aluminum cylinder of 200 grams at a speed of 45 m/sec, and speeds of the cylinder and the golf ball before and after the impingement are measured to calculate the coefficient of restitution of each golf ball from their respective speeds and weights. Each ball is measured five times to calculate an average value, which is represented by a relative value with the measured value obtained in comparative example 1 represented as 100. Table 1 shows a result thereof.

(8) Resistance to Abrasion

A robot machine having a commercially available sand wedge attached thereto is used with a head speed set at 36 m/sec to hit each of 6 golf balls at two portions, each once. The two hit portions are visually observed and evaluated in accordance with the following criterion:

◯: a scratch is left on the ball surface faintly but substantially negligible.

Δ: a scratch is left on the ball surface clearly and scuffing is observed slightly.

x: the ball surface is considerably scratched and scuffing is observed clearly.

In the present examples, insufficiency in thickness of the cover was not observed except in example 6. In example 6, two of the 50 balls were observed to have insufficiency in thickness of the cover with a length of up to about 0.5 mm, which is a slight defect that becomes substantially negligible after being painted. All the present examples showed excellent resistance to abrasion. By contrast, comparative examples 1 to 4, which employ the injection molding process to form a half shell in the first step, all showed poor resistance to abrasion, and cracks were formed in comparative example 3. As for comparative examples 5 and 6, in which a cover was injection molded directly on a core, the cover in comparative example 5 having a thickness of 1.0 mm showed poor performance in the ball's sphericity, the level of average uneven thickness of the cover, and resistance to abrasion, and the cover in comparative example 6 having a thickness of 0.8 mm could not even be molded. It can thus be found that, by employing the heat and compression molding process to form a half shell and to mold the half shells joined together on a core or an intermediate layer to cover it, a cover having a small thickness can be produced with a uniform thickness, and a golf ball presenting excellent resistance to abrasion can be produced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of producing a golf ball, including molding a cover material mainly composed of a thennoplastie resin into two half shells in turn arranged on a core or an intermediate layer and joined together and ten introduced into a mold formed of semispherical pieces, and heat and compression molded to allow a cover to cover the core, the method comprising:
   a first step to form the half shells by a heat and compression molding process, and
   a second step to allow the two half shells to be arranged on the core or the intermediate layer, joined together, and heat and compression molded to mold the cover to have a thickness of 0.3 to 1.0 mm, and wherein in the second step, if the mold has a temperature T1° C. and the half shells start to flow at a temperature T2° C. T1 minus 2 is set within a range of −3° C. to 10° C.

2. The method of claim 1, wherein the half shell is molded to allow the two half shells to have a volume in total of 105% to 120% relative to that of the cover of the golf ball.

3. The method of claim 1, wherein the second step includes a low pressure molding step exerting a pressure set within a range of 0.5 to 5 MPa and a subsequent, high pressure molding step exerting a pressure set within a range of 10 to 15 MPa.

4. The method of claim 1, wherein the cover is made from thermoplastic polyurethane elastomer.